US006654901B1

(12) United States Patent
Nakai et al.

(10) Patent No.: US 6,654,901 B1
(45) Date of Patent: Nov. 25, 2003

(54) METHOD OF READING MULTIMEDIA INFORMATION, AN APPARATUS FOR READING MULTIMEDIA INFORMATION, A STORAGE MEDIUM DRIVE DEVICE, A TRANSFER MEDIUM, AN INFORMATION STREAM, AND A ELECTRON DEVICE

(75) Inventors: Kosuke Nakai, Kanagawa (JP); Seiro Taniyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/471,047

(22) Filed: Dec. 22, 1999

(30) Foreign Application Priority Data

Nov. 5, 1999 (JP) ............................................. 11-316114

(51) Int. Cl.$^7$ ............................................... G06F 11/00
(52) U.S. Cl. ............................... 714/1; 714/774; 725/93
(58) Field of Search ............................. 714/747, 1, 774; 709/102, 103; 725/93, 88, 89; 370/487; 348/552; 711/158

(56) References Cited

U.S. PATENT DOCUMENTS

| 5,173,900 | A | * | 12/1992 | Miller et al. ................. 370/349 |
| 5,974,439 | A | * | 10/1999 | Bollella ........................ 709/102 |
| 6,032,200 | A | * | 2/2000 | Lin ............................... 710/21 |
| 6,038,679 | A | * | 3/2000 | Hanson .......................... 714/15 |
| 6,219,814 | B1 | * | 4/2001 | Coker et al. ................. 714/763 |
| 6,223,324 | B1 | * | 4/2001 | Sinha et al. ................. 714/774 |
| 6,233,709 | B1 | * | 5/2001 | Zhang et al. ................ 714/774 |
| 6,243,866 | B1 | * | 6/2001 | Rudolph et al. ............ 370/262 |
| 6,263,411 | B1 | * | 7/2001 | Kamel et al. ................ 711/167 |
| 6,349,410 | B1 | * | 2/2002 | Lortz ........................... 725/110 |
| 6,363,204 | B1 | * | 3/2002 | Johnson et al. ............. 345/718 |
| 6,363,461 | B1 | * | 3/2002 | Pawlowski et al. ......... 711/158 |
| 6,378,035 | B1 | * | 4/2002 | Parry et al. ................. 711/110 |
| 6,412,049 | B1 | * | 6/2002 | Baxter et al. ............... 711/158 |
| 6,415,367 | B1 | * | 7/2002 | Baxter et al. ............... 711/158 |
| 2001/0054055 | A1 | * | 12/2001 | Bollella ....................... 345/723 |
| 2002/0044570 | A1 | * | 4/2002 | Gurusami et al. .......... 370/487 |

* cited by examiner

Primary Examiner—Robert Beausoliel
Assistant Examiner—Marc Duncan
(74) Attorney, Agent, or Firm—Frommer Lawrence & Haug LLP; William S. Frommer; Glenn F. Savit

(57) ABSTRACT

A method of reading multimedia information which is capable of realizing optimal data access in consideration of the type and content of data to be accessed and the relationship to other data during access. The method involves reading first and second information from a storage medium, multiplexed with each other, where response time guarantee is of relatively higher importance for the first information and reliability is of relatively higher importance for the second information. Management of the read time is performed on both the first and second information. A plurality of processing methods are pre-defined as error countermeasure methods for the case where an error occurs in information read out when reading the first or second information in units of predetermined amounts. When reading information, one of the plurality of error countermeasure processing methods is selected and set for use.

8 Claims, 10 Drawing Sheets

| ERROR COUNTERMEASURE PROCESSING | INSTANT INTERRUPTION TYPE ERROR PROCESSING | CONTINUOUS READ PROCESSING WITH ERROR REPORT | CONTINUOUS READ PROCESSING WITHOUT ERROR REPORT |
|---|---|---|---|
| GUARANTEE OF DATA CONTENTS | YES | NO | NO |
| TIME GUARANTEE FUNCTION | YES | YES | YES |
| GUARANTEE OF TRANSFER DATA AMOUNT | NO | YES | YES |
| ERROR REPORT | YES | YES | NO |
| ERROR REPORT TIMING | IF AN ERROR OCCURS DURING EXECUTION OF A COMMAND, EXECUTION IS STOPPED AND A REPORT IS ISSUED QUICKLY | EVEN IF AN ERROR OCCURS, REPORT IS ISSUED AFTER ALL DATA IS TRANSFERRED | — |

FIG.6

| CHARACTERISTICS | AV DATA | IT DATA (SINGLE ACCESS) | IT DATA (ACCESS MIXED WITH AV DATA) |
|---|---|---|---|
| USE EXAMPLE | VIDEO DATA, AUDIO DATA | EPG | EPG |
| CONTINUITY OF DATA OUTPUT | NECESSARY | UNIMPORTANT | NECESSARY |
| RELIABILITY OF DATA OUTPUT | MORE OR LESS ERRORS ARE PERMITTED | NECESSARY | NECESSARY |

FIG.12

METHOD OF READING MULTIMEDIA INFORMATION, AN APPARATUS FOR READING MULTIMEDIA INFORMATION, A STORAGE MEDIUM DRIVE DEVICE, A TRANSFER MEDIUM, AN INFORMATION STREAM, AND A ELECTRON DEVICE

BACKGROUND OF THE INVENTION

A method of reading multimedia information, an apparatus for reading multimedia information, a storage medium drive device, a transfer medium, an information stream, and an electronic device

TECHNICAL FIELD

The present invention relates to a method and an apparatus for reading mixedly first information such as video information, audio information, or the like for which guarantee of response time is important, and second information such as electronic program table data or the like for which reliability is important, from a storage medium such as a hard disk or the like.

A system which reads data from a random-accessible storage medium such as a hard disk or the like normally comprises a storage medium drive section such as a hard disk drive, and a host computer section for sending a read command to the storage medium drive section thereby to control execution of data reading. The storage medium drive section and the host computer section are separate from each other in some cases, or the storage medium drive section is included in the host computer.

Conventionally, in this kind of system, the data to be read from the storage medium is mainly data used for calculations or the like in the computer, and reliability of the data is important. Therefore, the response time taken to transfer data from the storage medium drive section to the host computer side in response to a read command from the host computer side is considered as being much less important in many cases.

That is, upon receipt of a read command from the host computer section, the storage medium drive section accesses a storage medium any number of times until errors are lost, to read correct data and transfer it to the host computer section side.

In recent years, a random accessible storage medium such as a hard disk, DVD (Digital Versatile Disk or Digital Video Disk), or the like has come to be able to store a large amount of data. From this background, a data reading apparatus has come to deal with not only data (which will be hereinafter called IT (Information Transfer) data) used for computer programs and calculations, as in a conventional apparatus, but also video data and audio data (which will be hereinafter called AV (Audio & Visual) data).

A conventional data reading apparatus, however, does not adopt a method in which AV data and IT data are not differentiated from each other and the response time of data is much less important.

Meanwhile, characteristics required for the host computer section and the storage medium drive device such as a hard disk drive or the like are different from each other, depending on the application use of data.

Conventionally, opportunities for data access to the IT data and that to the AV data are determined as coming at the same time for a small number of times. Classification of characteristics with respect to data access is as shown in the table shown in FIG. 1.

That is, the following characteristics are required for access to AV data.

Re: Continuity of Data Output

In order that a user can watch and listen to AV data (on real time) while it is being read out, seamless playback is most important.

Re: Reliability of Data Contents

AV data has a characteristic that quality sufficient for watching or listening to the data can be maintained in many cases even when AV data contains much or less errors. However, since a certain part of AV data consists of a kind of data (e.g., time stamp, format information, or the like) which is important to play back a video image or sound, reliability concerning data contents is important with respect to this part.

Meanwhile, the following characteristics are conventionally required with respect to access to IT data, as shown in FIG. 11.

Re: Continuity of Data Output

There are conventionally fewer application uses of IT data for real-time providing to users, and therefore, continuity of data output is not required.

Re: Reliability of Data Contents

IT data always requires reliability at 100%. That is, the reliability concerning data contents is most important for IT data.

Differentiation of characteristics between conventional AV data and IT data described above exists on the basis of prerequisite that there are fewer opportunities for accessing IT data and AV data.

In recent years, however, there appears a system which issues access to IT data during a sequence of access to AV data. For example, there has been a proposal for an apparatus which enables time-shift monitoring in an apparatus such as a household set-top box, owing to realization of digital TV broadcasting and appearance of a storage medium having a large capacity such as a hard disk which enables random access.

This apparatus comprises, for example, a hard disk apparatus section and a host computer section, so that broadcasting programs to be watched and listened to, EPG (Electrical Program Guide; electronic program tables) appended to programs, World Wide Web information (Hyper Text Makeup Language information), and the like are previously taken into a hard disk having a large capacity. Further, a user accesses the hard disk in the hard disk device section through the host computer section later, to watch and listen to his or her favorite programs at a preferable time or to watch or record EPG or Web information into a VCR (Video Cassette Recorder).

In this kind of apparatus which enables time-shift monitoring, for example, EPG or Web information is displayed while watching and listening to a predetermined TV program, to watch the contents of the EPG and Web information, or EPG is displayed on the screen while recording a certain TV program. Thus, various application uses are proposed. Therefore, there appears a situation that access to IT data such as EPG occurs during a sequence of access to AV data for watching and listening to a TV program.

Thus, if access time for IT data is not guaranteed in a system which issues access to IT data during a sequence for accessing AV data, there may be a case that access to AV data coming next cannot be executed in accordance with a schedule of the host computer.

That is, for example, in the time-shift monitoring as described above, access for obtaining EPG data continues until correct data of EPG is outputted from a hard disk, if EPG data contains an error when the EPG data is accessed during a sequence of accessing AV data to watch and listen to a broadcasting program by a conventional access method which does not guarantee access time.

FIG. 2 shows the data stream of the sequence at this time. Although data is read from the hard disk in units of predetermined amounts in response to a read command from the host computer section, there is no time guarantee with respect to EPG data, and therefore, the host computer section continues accessing the hard disk with respect to EPG data any number of times until no errors are detected the EPG data contains errors. In this situation, AV data is interrupted during the time period in which the EPG data is being accessed.

Hence, in case where IT data is thus accessed in an access sequence for a series of AV data and AV data and IT data are read out mixedly from the hard disk, a conventional method of differentiating data, described above and shown in the table in FIG. 1, is not required but differentiation concerning IT data to be accessed mixedly together with AV data is required. That is, continuity of data is an indispensable requisite with respect to IT data in this case.

As described above, basically, time guarantee is not achieved with respect to data access in a data reading apparatus used in a conventional system, but normally, only the reliability concerning data contents to be outputted is taken into consideration. It is not possible to perform processing corresponding to noble data access as shown in FIG. 12 described above. In addition, even if it is tried to take in the concept of time guarantee, only same commands (or protocol) can be used with respect to recording/reproducing from the host computer, and therefore, flexible access corresponding to the characteristic of each data cannot be realized.

Hence, to process AV data which requires response time guarantee, a buffer memory having a large capacity is conventionally provided in the storage media drive side so that data to be continued might not be interrupted.

In this method, however, the storage media drive side requires a buffer memory having a large capacity, resulting in a problem that the system cost increases. In particular, when a data reading apparatus is mounted in a household AV electronic apparatus, this problem is as large as cannot be neglected.

Even if a buffer memory having a large capacity is provided, data continuity is not essentially guaranteed by the data reading apparatus, and therefore, the possibility of causing an interruption of video data and a jump of sound data cannot be neglected though its provability of occurrence is low. In particular, the transfer rate required for AV data dealt with by the digital AV system has become high in recent years.

For example, a so-called DV (Digital Video) format which has come to be used generally requires a transfer rate of about 30 Mbps, and a memory of at last 60 Mb is required to prepare a buffer for two seconds in the system side, so that increase of the cost is a serious problem. For example, if three seconds are taken to attain an access result as a result of repeatedly trying to read data in a hard disk or the like with respect to access AV data, continuity of AV data cannot be guaranteed even with the system as described above.

Meanwhile, if case of using a data reading apparatus which simply guarantees the access time but does not guarantee the reliability of data contents, the apparatus functions to a certain extent but a problem occurs when access is made mixedly together with IT data which indispensably requires reliability concerning data contents, with respect to access to AV data. Further, with respect to AV data, a part of data includes a portion whose contents are taken as being important as described above, and therefore, all reliability concerning data contents cannot be unnecessary.

SUMMARY OF THE INVENTION

The present invention has an object of providing a method of reading multimedia information capable of optimal data access and an apparatus thereof, in view of the above-mentioned points and in consideration of the kinds and contents of data to be accessed and further the relationship with other data during access.

To solve the above problem, in the method of reading multimedia information according to claim 1 of the present invention, first information for which response time guarantee is important and second information for which reliability is important are read from a storage medium, with the first information and the second information mixed with each other, wherein management of read time is performed not only on the first information but also on the second information.

According to the invention constructed as described above, management of the read time is carried out for the second information such as IT information or the like for which reliability is important. It is possible to avoid interruption of the continuity of the first information such as AV data or the like for which response time guarantee is important.

In the invention described in claim 2, in the method according to claim 1, each of the first information and the second information is read in units of predetermined amounts, and a maximum value of a read time for the unit of the predetermined amount is set to manage the read time.

According to the invention described in claim 2, information is read in units of predetermined amounts, and the information read time can be managed with the maximum value of the unit of the predetermined amount used as a limit value. It is therefore possible to guarantee maintenance of the continuity of the first information and the second information.

Further, in the invention described in claim 4, in the method according to claim 2, a plurality of error countermeasure processing methods are previously defined in case where an error occurs in information read out when reading the first or second information in units of the predetermined amounts, and when reading the first or second information, which of the plurality of error countermeasure processing methods should be used is set.

In case where time management is performed on the second information, an error countermeasure processing method is always required for the case where correct information could not be obtained within a management time. According to the invention described in claim 4, however, a plurality of error countermeasure processing methods are previously defined, and any one selected from the plurality of error countermeasure processing methods can be set when reading the first information and the second information. Therefore, it is possible to carry out read processing matched with the characteristics of the first information and the second information.

As has been explained above, according to the present invention, it is possible to provide a method and an apparatus for reading multimedia information, which are capable of making optimum data access in consideration of the type and content of data to be accessed and the relationship to other data during access. In addition, a buffer having a large capacity is not required in the side of the storage media drive.

BRIEF DESCRIPTION OF THE SEVERAL VIEWS OF THE DRAWING

FIG. 6 is a table for explaining examples of error countermeasure processing methods used in an embodiment of a method of reading multimedia information according to the present invention.

FIG. 12 is a view for explaining novel differentiation of data.

DETAILED DESCRIPTION OF THE INVENTION

Figures 1, 2:
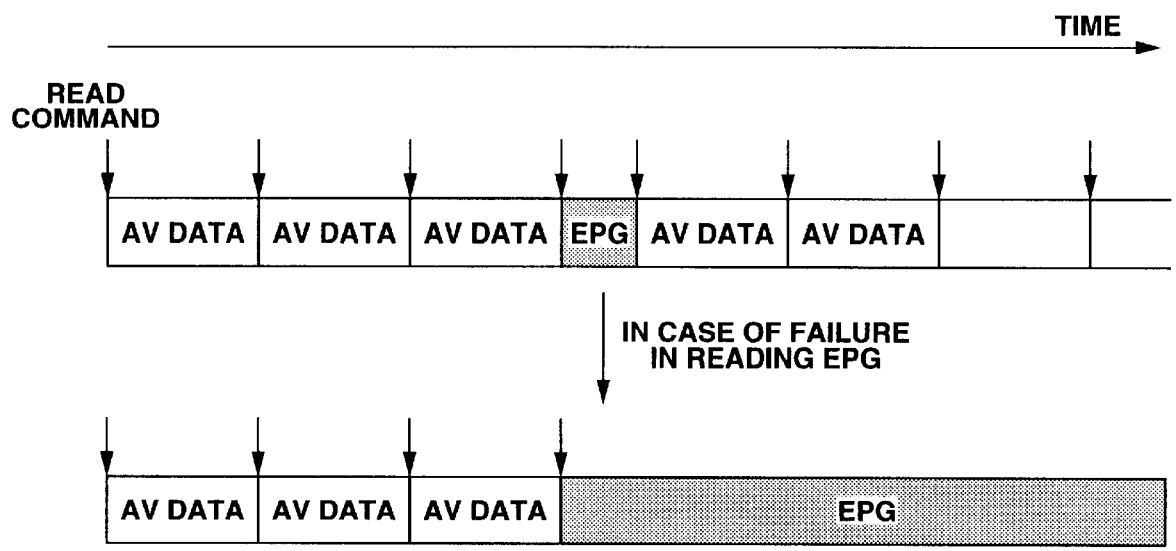
FIG. 1 is a view for explaining conventional differentiation of data.
FIG. 2 is a view for explaining a stream of data read out by a conventional method of reading multimedia information.
Figure 3:
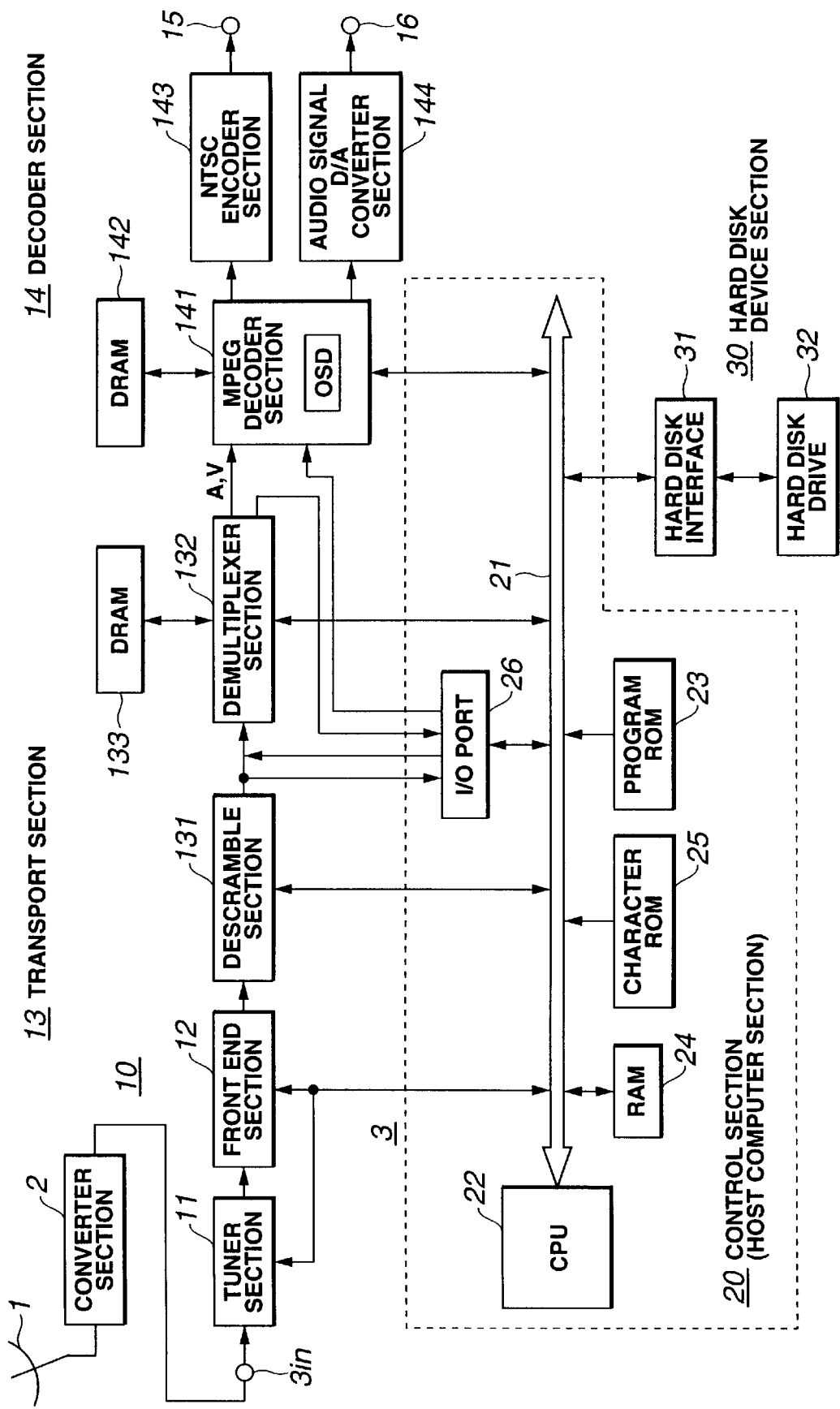
FIG. 3 is a block diagram showing an example of an electronic apparatus using an embodiment of a method of reading multimedia information according to the present invention.

In the following, embodiments of the present invention will be explained with reference to the drawings. FIG. 3 is a block diagram wherein an embodiment of a method of reading multimedia information and an apparatus thereof according to the present invention is applied to a set-top box which receives digital broadcasting.

In digital broadcasting systems, there is a case that signals of a plurality of broadcasting programs multi-layered on one carrier are broadcasted. The receiver apparatus according to the embodiment explained below can receive and demodulate signals multi-layered onto one carrier of this kind, thereby to enable extraction and utilization of the signal of a broadcasting program as a target, and can also include a hard disk apparatus to enable so-called time-shift monitoring described above.

In FIG. 3, a satellite broadcasting electric wave in the range of 12 GHz received by a receiver antenna 1 is frequency-converted into a medium frequency signal in the range of 1 GHz by a low-noise converter section 2, and is thereafter inputted to a set-top box 3 through an input terminal 3 in.

The set-top box 3 in this example comprises components roughly divided into a receive signal processing section 10, a control section 20, and a hard disk device section 30. The control section 20 constructs a host computer section which responds to the hard disk device section 30 as will be described later.

The receive signal processing section 10 comprises a tuner section 11, a front end section 12, a transport section 13, and a decode section 14, and performs processing such as decoding of a received and selected carrier, to output a broadcasting program which is selected and instructed by a user.

Also, the control section 20 is constructed by a micro computer which is connected with a CPU 22, a program ROM 23, a work area RAM 24, a character ROM 25 storing characters such as Chinese letters and the like, and an I/O port 26 through a system bus 21, and controls respective sections of this set-top box 3. Here, the work area RAM 24 is used as a work area for processing performed by the control section 20. Processing programs to be executed in this control section 20 and data used for various processing are stored in the program ROM 23, and character data such as Chinese letter font data, letters, symbols, figures, and the like is stored in the character ROM 25.

Further, the hard disk device section 30 consists of a hard disk interface 31 and a hard disk drive 32, and the hard disk drive 32 is connected to the system bus 21 of the control section through a hard disk interface 31.

In case of this embodiment, the tuner section 11 is constructed in a tuner structure according to a so-called synthesizer system, and data concerning a frequency dividing ratio of a variable frequency dividing circuit of a PLL loop (Phase Locked Loop) is supplied as a tuning control signal to the tuner section 11 from the control section 20. The control section 20 supplies, to the tuner section 11, data concerning the frequency dividing ratio corresponding to an input operation for a channel selection command made by a user although not shown.

The tuner section 11 receives a tuning control signal from the control section 20 and selects one carrier from a plurality of carriers contained in a medium frequency signal inputted through the input terminal 3 in.

An output from the tuner section 11 is supplied to a front end section 12. The front end section 12 comprises an A/D converter, a demodulator section, a channel equalizer, and an error correction decoder section. Further, the front-end section 12 converts a signal from the tuner section 11 into a digital signal and performs digital-demodulation thereon.

Further, the front end section 12 performs so-called ghost-canceling on the digital-demodulated signal, based on control information from the control section 20, and corrects bit errors caused on a transmission path, thereby to obtain a transport stream output. In case of satellite digital TV broadcasting, strong error correction coding is applied in order to excellent and stable receiving quality even during low C/N receiving due to rain. For example, Viterbi coding, Read Solomon coding, and Trellis coding modulation systems are adopted.

The front end section 12 sends a transport stream output obtained by performing demodulation and error correction processing as described, to a transport section 13. The transport stream almost consists of signals scrambled for limited receiving in a pay TV.

The transport section 13 comprises a de-scramble section 131, a demultiplexer section 132, and a DRAM 133 used as a work area during demultiplex processing. Further, the transport stream output from the front end section 12 is supplied to the descramble section 131 of the transport section 13. Here, descramble processing is performed on the transport stream to release scramble.

The descrambled transport stream is formed by multiplexing a plurality of programs and is supplied to the demultiplexer section 132. This transport stream is also supplied to the system bus 21 through the I/O port 26 so that the transport stream is supplied to the hard disk device section 30.

Figure 4:
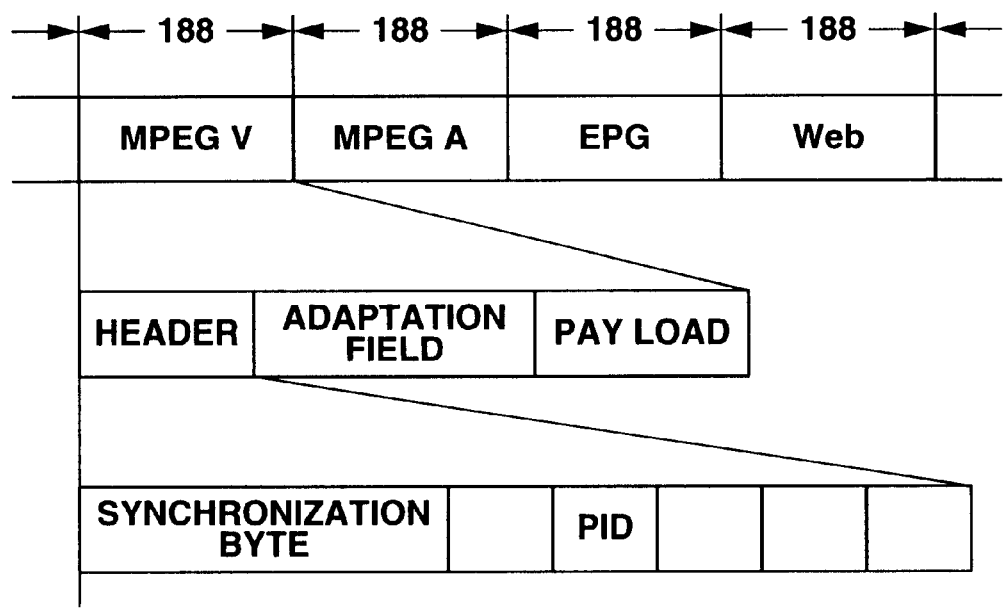
FIG. 4 is a view for explaining a digital broadcasting signal.

FIG. 4 is a view for explaining the structure of a transport stream in which a plurality of programs are multiplexed. As shown in FIG. 4, the transport stream is a set of bit strings which are defined by the MPEG system and are packets (transport packets) having a fixed length of 188 byte.

Each transport packet consists of a header, an adaptation field for setting additional information into a specific individual packet, and a payload expressing the content of the packet.

The pay load stores IT data which is processed by the computer forming part of the control section 20, such as data for realizing EPG (Electronic Program Guide: electronic program table), and various data (indicated by Web in FIG. 4) of home pages or game programs prepared by HTML (Hyper Text Makeup Language), in addition to MPEG-compressed video signals (MPEG V) and MPEG-compressed audio signals (MPEG A).

The header of each transport packet consists of 4 bytes and the top byte thereof is a synchronization byte. Further, this header stores a packet ID (PID (Packet IDentification) as identification information of the packet, control information which expresses presence or absence of scramble or presence or absence of a subsequent adaptation field or pay load.

Figure 5:
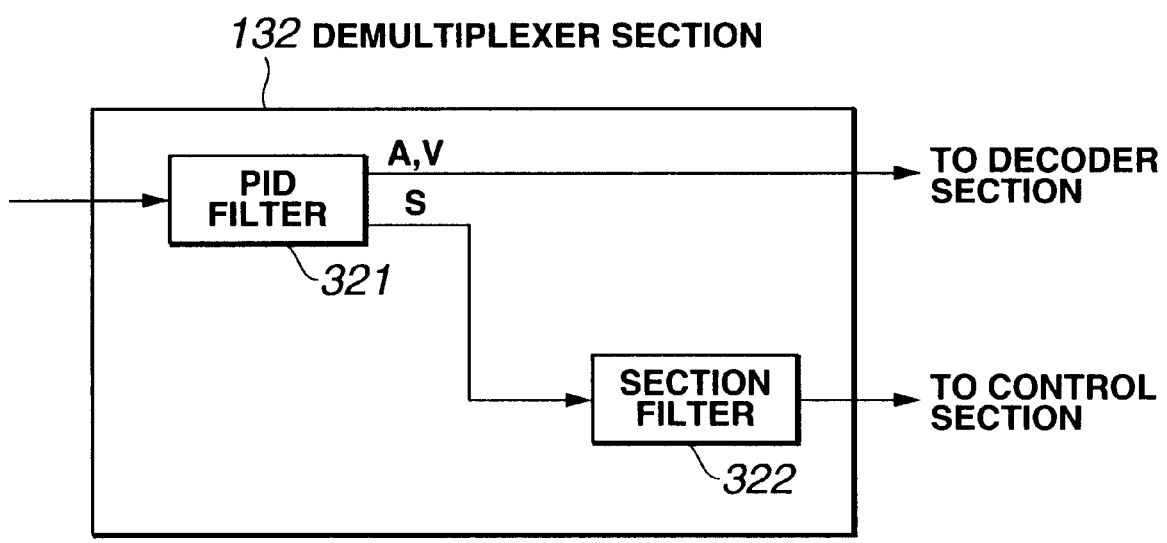
FIG. 5 is a view for explaining a structural example of a partial block in the block diagram of FIG. 3.

Further, in the demultiplexer section 132, necessary packets such as a MPEG-compressed video signal of a selected program or a MPEG-compressed audio signal, EPG data, data concerning limited receiving, or the like are separated/extracted by program selection from the control section 20 by a user and demultiplex processing according to a read instruction concerning EPG. FIG. 5 is a block diagram for explaining the demultiplexer section 132. The demultiplexer section 132 comprises a PID filter 321 and a section filter 322. Further, in the PID filter 321, the MPEG-compressed video signal V and audio signal A (AV data) of the program corresponding to the program selection made by the user are extracted, based on PID added to the header of each transport packet, and EPG data and various IT data such as data concerning limited receiving are separated/extracted.

Further the video signal V and the audio signal A of the program selected by the user are supplied to the decoder section 14. Meanwhile, IT data S is supplied to a section filter 322 which separates/extracts necessary data such as EPG data or the like, which is supplied to the control section 20.

Note that the demultiplexer section 132 reproduces a program clock reference which serves as a reference for synchronous reproducing of video and audio signals in the demultiplex section 132.

The decoder section 14 comprises a MPEG decoder section 141, a DRAM 142 used as a work area during MPEG decoding processing, an NTSC encoder section 143, and an audio signal D/A converter circuit 144.

In the MPEG decoder section 141 the MPEG-compressed video signal V and audio signal A of the program selected by the user are subjected to decompression processing, i.e., MPEG-decode processing.

The video signal thus decompressed by the MPEG decoder section 141 is supplied to an NTSC encoder 143 and is converted into an analogue video signal of the NTSC system. The video signal thus converted into an analogue signal of the NTSC system is supplied to a monitor receiver set and a video image is displayed on the display screen of the monitor receiver set.

Meanwhile, the decompressed audio signal is supplied to an audio signal D/A converter circuit 144 and is converted into an analog audio signal therein. This analogue audio signal is supplied to a speaker of the monitor receiver set through an external output terminal 16, and a sound is generated from the speaker.

Also, the MPEG decoder section 141 in this example has an OSD (On Screen Display) function and is arranged to be able to make processing such that EPG, a menu, or the like can be displayed and overlapped on the video image of the program as a target.

That is, IT data separated/extracted from the demultiplexer section 132 is inputted to the control section 20 through the I/O port 26. The control section 20 generates display data of an electronic program table or the like from EPG data with use of font data from the character ROM 25, and supplies the data to the MPEG decoder section 141 through the I/O port 26. In this manner, an electronic program table or the like is displayed, overlapped over the image of the program or in place of the image of the program.

The above explanation has been made of a case where a program is watched and listened to on real time. As has been described above, time-shift monitoring is enabled with use of the hard disk device section 30 in the set-top box according to the present embodiment.

That is, a user previously inputs a selection of a program to be subjected to time-shift monitoring or a request for obtaining IT data such as EPG data through a remote controller not shown or a key operation section.

Then, under control by the control section 20, a transport stream containing packets of MPEG-compressed video signals and audio signals (AV data) of a plurality of broadcasting programs selected by the user and packets of IT data such as EPG data or the like is supplied from the descramble section 131 through the I/O port 26 and the hard disk interface 31 to the hard disk drive 32 and is written and stored into the hard disk. In this case, the hard disk device section 30 writes and reads data in units of sectors each consisting of data predetermined by the hard disk drive section 30.

When the user inputs an instruction for time-shift monitoring and an instruction for calling an electronic program table to the control section 20 through a remote controller or a key operation section at a time point after writing is carried out as described above, the control section 20 as a host computer section accesses the hard disk device section 30 and executes read processing in accordance with the instruction from the user, in the following manner.

(Re: Processing for Reading From the Hard Disk Device Section 30)

In the present embodiment, reading is carried out in units of predetermined data amounts (each of which will be called a block hereinafter) by the hard disk device section 30, as has been explained previously. The data amount of this block may be equal to or different from the data amount of the packet. Further, in the present embodiment, the control section (hereinafter called a host computer section) 20 generates a read command for every data unit of the packet unit described above, and supplies the read command to the hard disk device section 30. The hard disk device section 30 reads a number of blocks corresponding to the data amount of the size instructed by the read command, and transfers the data thus read out to the host computer section 20.

The host computer section 20 supplies appropriately the data obtained from the hard disk device section 30, as a transport stream, to the demultiplexer section 132 through the I/O port 26. Accordingly, AV data and IT data are subjected to decoding processing like in the manner described above, or processing for generating an electronic program table is carried out. The AV data and IT data or the electronic program table is supplied to the monitor receiver set and displayed on the screen or reproduced as a sound.

In the present embodiment, the hard disk device section 30 performs management of read time with respect to reading of not only AV data but also IT data. Management of this read time is carried out in accordance with an instruction from the host computer section 20.

That is, the host computer section 20 sets the maximum value of the read time in consideration of the capacity of the buffer which the section 20 has and the transfer rate of data from the hard disk device section 30. Here, the maximum value of the read time is the time from when the hard disk device section 30 receives a read command from the host computer section 20 to when data read out from the hard disk is returned to the side of the host computer section 20.

Further, the host computer section 20 sends the maximum value of the read time, as configuration data (or attribute data) concerning time management, to the hard disk device section 30 before reading access is executed. Upon receipt of the configuration data, the hard disk device section 30 stores this data into a configuration register and uses it for time management when reading data for every unit data amount.

In the present embodiment, time management is carried out with respect to all data as described above, and therefore, error-countermeasure processing is necessary. In the present embodiment, three kinds of error-counter processing methods are defined previously.

FIG. 6 is a table for explaining the three kinds of error-countermeasure processing methods. The first error-countermeasure processing method according to the present invention is processing of an instant interruption type. As shown in the table of FIG. 6, this instant interruption type processing instantly interrupts read processing upon occurrence of an error in read-out data and sends the data which has been read out till the occurrence of an error, together with an error occurrence report, to the host computer section 20.

The second error-countermeasure processing method is continuous read processing with an error report. In this continuous read processing with an error report, all the predetermined amount of data to be read out is transferred to the host computer section 20, and when an error occurs in the data to be read out, the occurrence of the error is reported after having transferred the data.

The third error-countermeasure method is continuous read processing without an error report. In this continuous read processing without an error report, all the data to be read out is transferred to the host computer section 20, and even when an error occurs in the data to be read out, the occurrence of the error is not reported.

In the present embodiment, which one of the three kinds of error-countermeasure methods the hard disk device section 30 should use to perform error-countermeasure processing is instructed as additional information to the hard disk device section 30 from the control section 20 as the host computer section, for every read command.

The host computer section 20 sets any one of the three kinds of error-countermeasure processing methods that should be used, in accordance with the kind of data to be read out or the application purpose of read-out data, for every read command, and notifies the hard disk device section 30 of it.

In the case of the present embodiment, however, if the target to be read out is IT data, setting is arranged so as to adopt the instant interruption type processing method of the first error-counter measure processing method as the error-countermeasure processing method thereof This is because priority is given to guarantee of data contents. Otherwise, if the target to be read out is AV data, any of the three kinds of error-countermeasure methods that the host computer section 20 determines as being appropriate is selected and set as the error-countermeasure method thereof.

Figure 7:
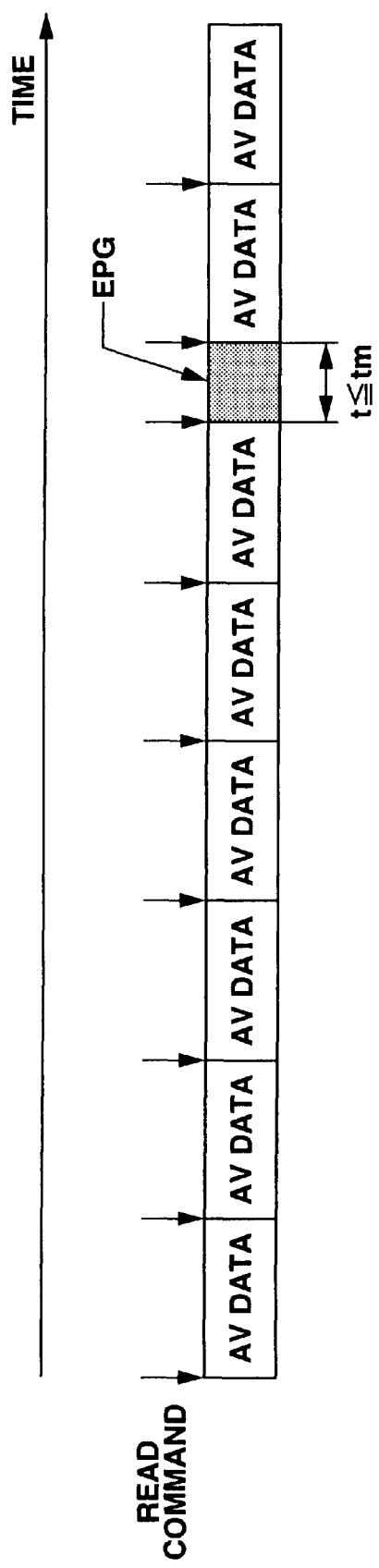
FIG. 7 is a view showing an example of a data stream read out by an embodiment of a method of reading multimedia information according to the present invention.
Figure 8:
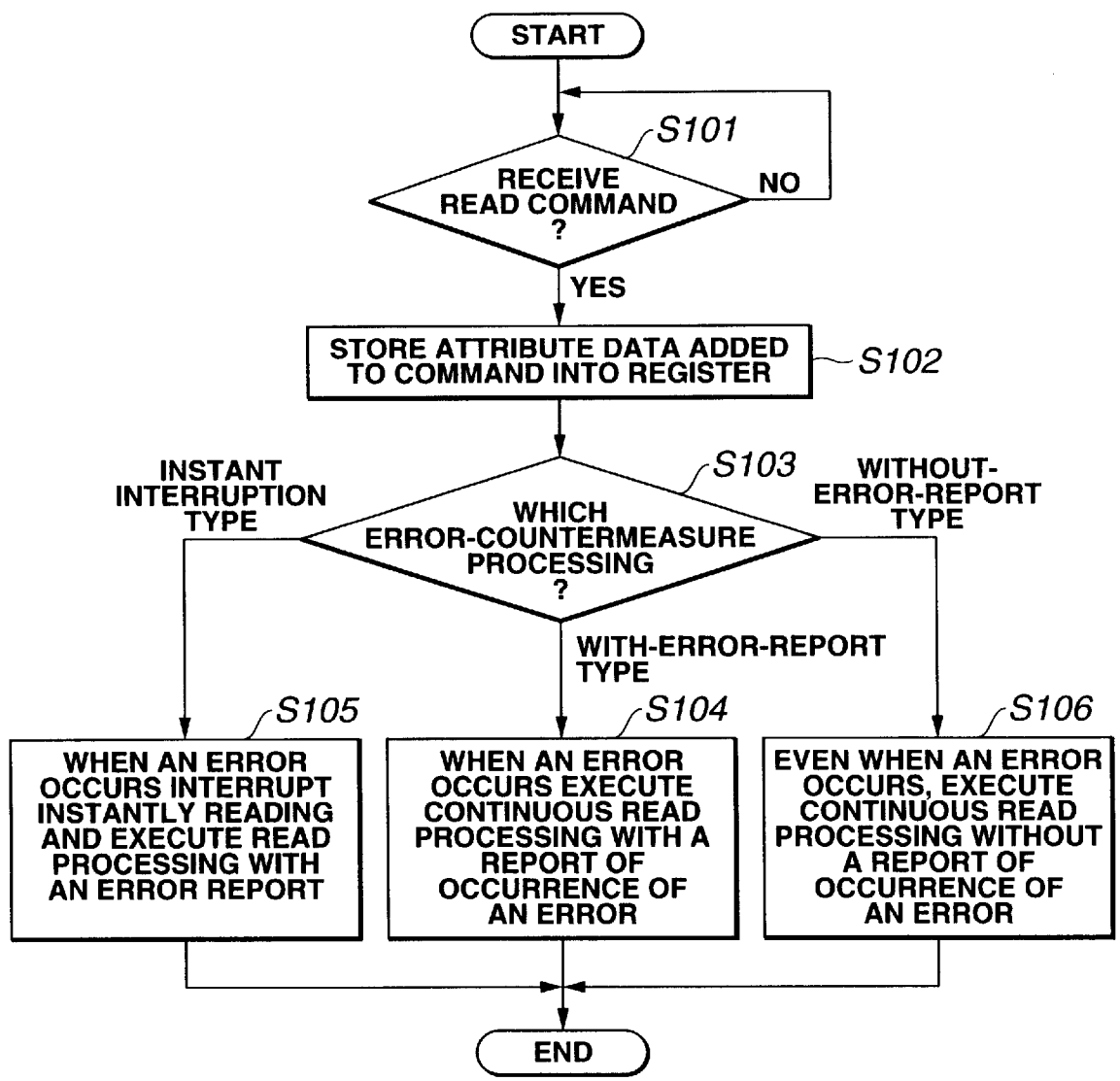
FIG. 8 is a flowchart for explaining a main part of an embodiment of a method of reading multimedia information according to the present invention.

As a result of performing time management and error-countermeasure processing as described above, in the hard disk drive 32, the data stream read out from the hard disk is as shown in FIG. 7, and the problem of an interruption of AV data as explained previously in the conventional example can be avoided.

That is, the example of FIG. 7 shows a flow in the case where a user requests time-shift monitoring of a particular program and requests monitoring of an electronic program table in the middle of the program. In accordance with the read command for every unit data amount, AV data and EPG data are read out. However, EPG data is read out within a time t equal to or shorter than the set maximum read time tm, unlike in the conventional case, and is transferred to the side of the host computer section 20.

Further, the host computer section 20 which has received data thus transferred performs appropriate processing corresponding to the error-countermeasure processing method, thereby to process the data.

Next, the read processing of data from the hard disk device section 30 explained above will further be explained with reference to a flowchart showing the flow of the processing.

In the present embodiment, at first, the maximum read time tm is sent as configuration data to the hard disk device section 30 from the host computer section 20. The hard disk device section 30 stores this data into the configuration data register.

Subsequently, the host computer section 20 issues a read command for every unit data amount of AV data of a program in accordance with selection made by a user and a read command for EPG data during a read sequence of the AV data, to the hard disk device section 30.

Upon receipt of the read command, the hard disk device section 30 executes processing as shown in FIG. 6.

That is, upon receipt of the read command from the host computer section 20 (in the step S101), the hard disk drive 32 of the hard disk device section 30 stores instruction data concerning an error countermeasure processing method, as attribute data added to the read command, into the configuration data register (in the step S102).

Further, any of the three kinds should be used (in the step S103) is determined as the error countermeasure processing method. Further, with use of the error countermeasure processing method as a determination result, read processing for reading the data instructed by the read command is executed (in the steps S105, S106, and S107).

Next, explanation will be made of read processing in case of each of the three kinds of error countermeasure processing methods.

Figure 9:
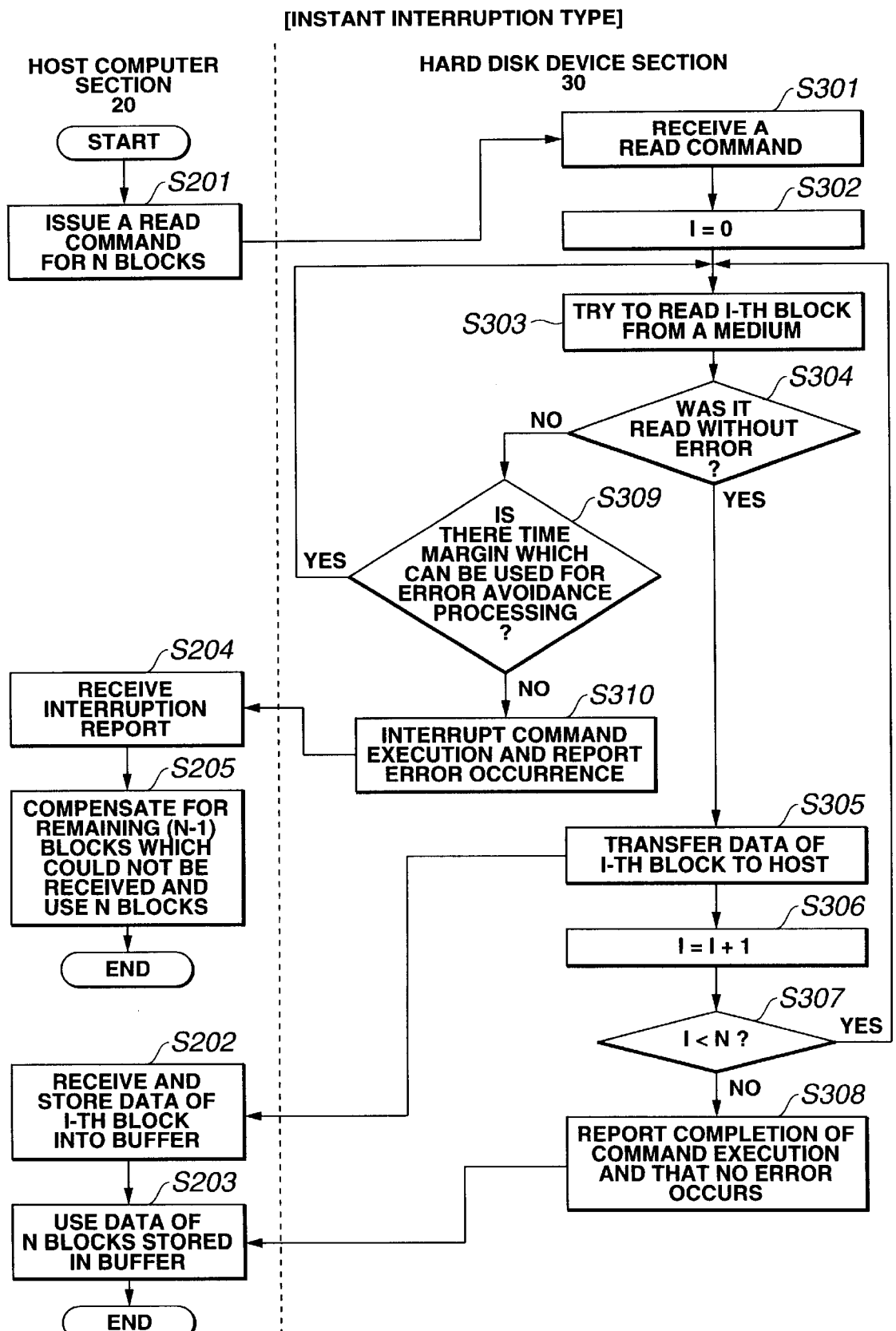
FIG. 9 is a flowchart for explaining a main part of an embodiment of a method of reading multimedia information according to the present invention.

At first, explanation will be made of a sequence of data read processing in case of using the error countermeasure processing method of the instant interruption type in the step S105, with reference to the flowchart shown in FIG. 9.

That is, the host computer section 20 generates a read command which specifies N blocks to be read by one read command (where one block is a minimum unit to be accessed from the hard disk, e.g., a sector) (in the step S201). Upon receipt of the read command from the host computer section 20 (in the step S301), the hard disk drive 32 of the hard disk device section 30 performs initialize processing for read processing (in the step S302). In FIG. 9, I=0 is set since the block number of the processing target is set I and the processing is preformed from I=0 to I=N−1.

Next, the hard disk drive 32 performs trial processing for reading data of the specified I-th block (in the step S303). Further, as a result of this read trial, whether or not reading was carried out without errors is determined (in the step S304). If reading was achieved without errors, the data of the I-th block thus read out is transferred to the side of the host computer section 20.

Upon receipt of the data of the I-th block thus transferred, the data of the I-th block is stored into the buffer (in the step S214).

Upon completion of transfer of the data of the I-th block to the side of the host computer section 20, the hard disk device section 30 updates the block number of the processing target to the next (I+1) block (in the step S306), and determines whether or not all the N blocks should be read depending on whether or not the updated block number is smaller than N (in the step S307). Further, if it is determined that all the N blocks have not yet been read, the processing from the step S303 is repeated. Otherwise, if it is determined that all the N blocks have been read, the host computer section 20 is reported of completion of command execution and that no error occurs (in the step S308).

In response to the report, the host computer section 20 uses data for N blocks stored in the buffer (in the step S203).

Meanwhile, in the step S304, it is determined that an error is contained in the read-out data, the hard disk drive 32 determines whether or not there is a time margin for performing error avoidance processing such as retrial, with reference to the maximum read time of the configuration data register (in the step S309). If it is determined that there is a time margin for performing error avoidance processing, the processing flow returns to the step S303 and tries again to read the data of the I-th block from the hard disk. Further, the processing from the step S304 described above is executed.

If it is determined that there is not a time margin for performing the error avoidance processing, execution of a read command is reported to the host computer section 20 (in the step S310).

Upon receipt of an interruption report accompanied by the error occurrence report (in the step S204), the host computer section 20 uses directly the I blocks read out without errors and stored in the buffer. With respect to data of (N-I) blocks which could not be received, the host computer section 20 performs compensation processing, for example, by supplementing dummy data to generate data for N blocks, and uses data for N blocks (in the step S205).

The read sequence in case of performing error countermeasure processing of the instant interruption type is as explained above. Next, a read sequence in case of performing error countermeasure processing of the continuous read type with an error report will be explained with reference to the flowchart shown in FIG. 10.

Figure 10:
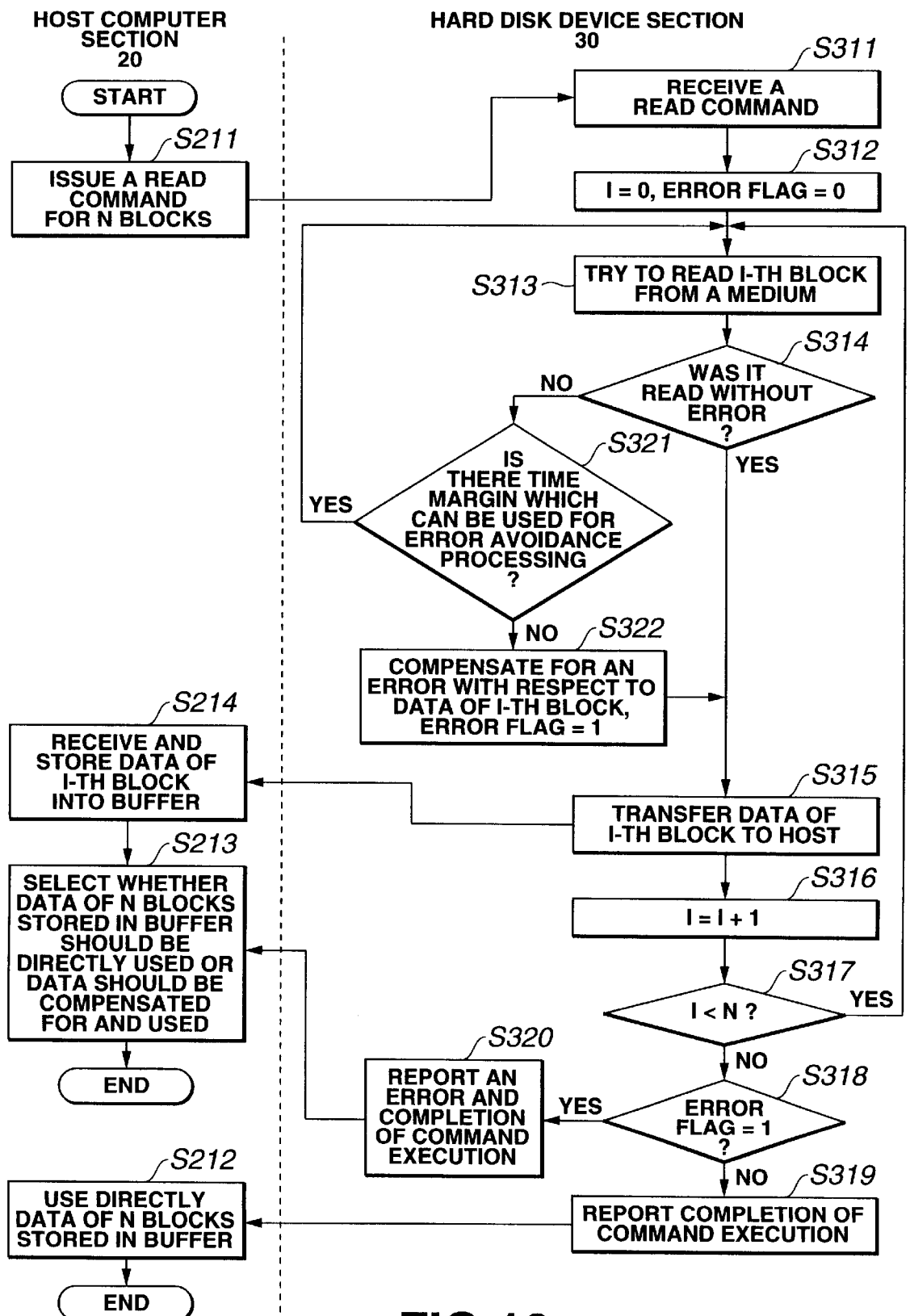
FIG. 10 is a flowchart for explaining a main pat of an embodiment of a method of reading multimedia information according to the present invention.

That is, the host computer section 20 generates a read command which specifies N blocks to be read by one read command (in the step S211). Upon receipt of the read command from the host computer section 20 (in the step S311), the hard disk drive 32 of the hard disk device section 30 performs initialize processing for read processing (in the step S312). In FIG. 10, I=0 is set since the block number of the processing target is set to I and the processing is performed from I=0 to I=N−1. Also, the error flag is set to "0" without errors.

Next, the hard disk drive 32 performs trial processing for reading data of the specified I-th block from the hard disk (in the step S313). Further, whether or not the data could be read without errors as a result of this trial reading is determined (in the step S314). If the data could be read without errors, the data of the I-th block thus read out is transferred to the side of the host computer section 20 (in the step S315).

Upon receipt of the data of the I-th block thus transferred, the host computer section 20 stores the data of the I-th block into the buffer (in the step S212).

Upon completion of transfer of the data of the I-th block to the side of the host computer 20, the hard disk device section 30 updates the block number of the processing target to the next (I+1) block (in the step S316), and determines whether or not all the N blocks have been read out depending on whether or not the updated block number is smaller than N (in the step S317). Further, if it is determined that all the N blocks have not yet been read out, the processing from the step S313 is repeated.

Otherwise, if it is determined that reading of all the N blocks has been completed, whether or not the error flag is "1" which indicates occurrence of an error is determined (in the step S318). Further, if the error flag is not "1", completion of command execution is reported to the host computer section 20 (in the step S319).

In response thereto, the host computer section 20 uses data for N blocks stored in the buffer (in the step S212).

Otherwise, if it is determined that the error flag is "1" as a result of the determination in the step S3 18, completion of command execution is reported to the host computer section 20, together with an error report (in the step S310).

In response to the report, the host computer section 20 determines whether the data of the N blocks stored in the buffer should be used directly or used after making compensation processing thereon, and the section 20 then uses the data of the N blocks (in the step S213).

Meanwhile, in the step S3 14, if it is determined that an error is contained in the data thus read out, the hard disk drive 32 determines whether or not there is a time margin for performing error avoidance processing such as retrial, with reference to the maximum read time of the configuration data register (in the step S321). If it is determined that there is a time margin for performing error avoidance processing, the processing flow returns to the step S313 and tries again to read the data of the I-th block from the hard disk. Further, the processing from the step S314 described above is executed.

If it is determined that there is not a time margin for performing the error avoidance processing, error compensation such as embedding of necessary dummy data is carried out and the error flag is set to "1" (in the step S322). The processing flow then goes to the step S315, and the data of the I-th block is transferred to the host computer section 20.

The host computer section 20 receives the data of this I-th block and stores it into the buffer (in the step S214).

Figure 11:
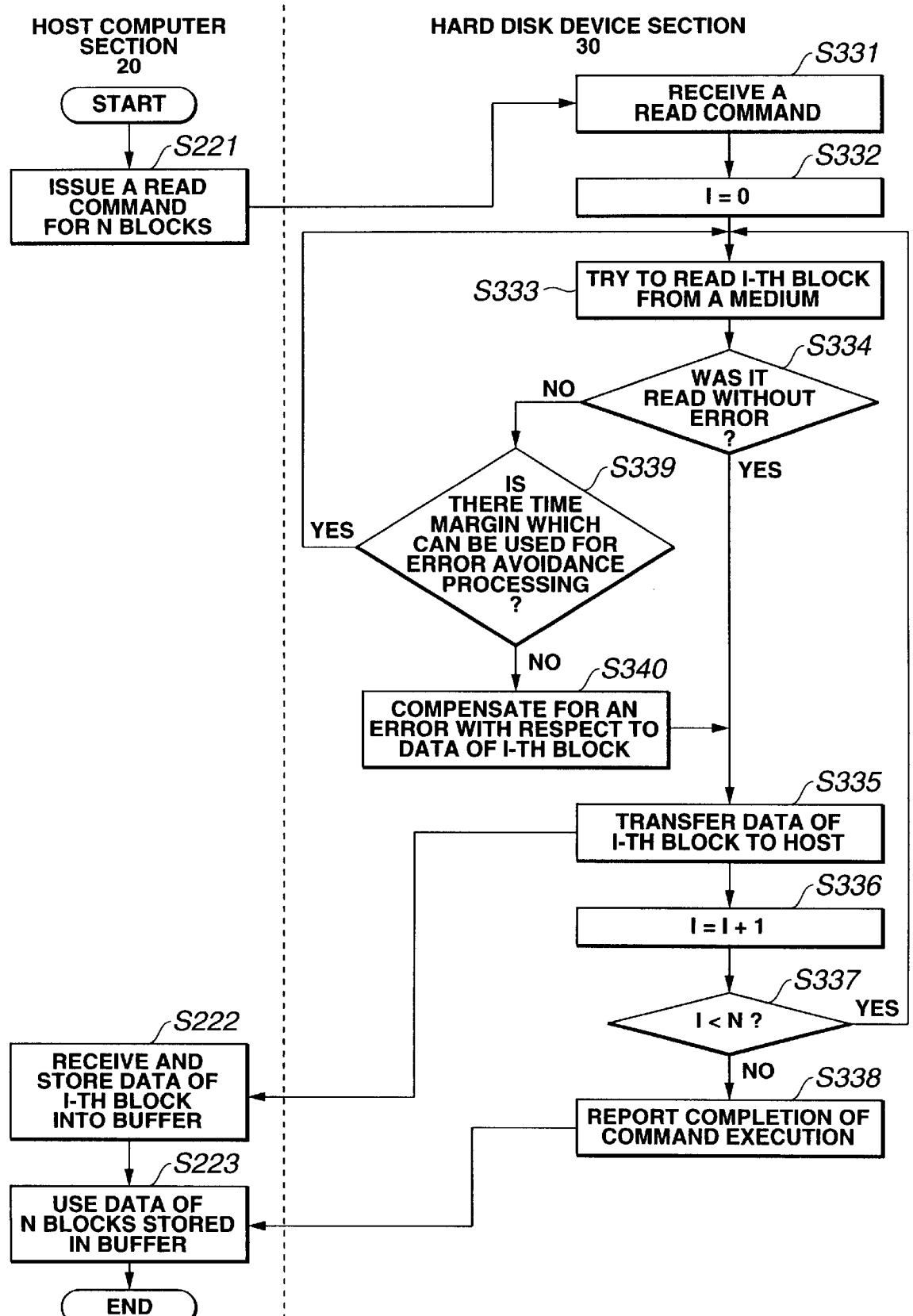
FIG. 11 is a flowchart for explaining a main part of an embodiment of a method of reading multimedia information according to the present invention.

Next, a sequence in case of performing error countermeasure processing of the continuous read type without an error report will be explained with reference to the flowchart shown in FIG. 11.

That is, the host computer section 20 generates a read command which specifies N blocks to be read by one read command (in the step S221). Upon receipt of the read command from the host computer section 20 (in the step S331), the hard disk drive 32 of the hard disk device section 30 performs initialize processing for read processing (in the step S332). In FIG. 11, I=0 is set since the block number of the processing target is set to I and the processing is performed from I=0 to I=N-1.

Next, the hard disk drive 32 performs trial processing for reading data of the specified I-th block from the hard disk (in the step S333). Further, whether or not the data could be read without errors as a result of this trial reading is determined (in the step S334). If the data could be read without errors, the data of the I-th block thus read out is transferred to the side of the host computer section 20 (in the step S335).

Upon receipt of the data of the I-th block thus transferred, the host computer section 20 stores the data of the I-th block into the buffer (in the step S223).

Upon completion of transfer of the data of the I-th block to the side of the host computer 20, the hard disk device section 30 updates the block number of the processing target to the next (I+1) block (in the step S336), and determines whether or not all the N blocks have been read out depending on whether or not the updated block number is smaller than N (in the step S337). Further, if it is determined that all the N blocks have not yet been read out, the processing from the step S333 is repeated.

Otherwise, if it is determined that reading of all the N blocks has been completed, completion of command execution is reported to the host computer section 20 (in the step S338).

In response to the report, the host computer section 20 uses data for N blocks stored in the buffer (in the step S222).

Meanwhile, in the step S334, if it is determined that an error is contained in the data thus read out, the hard disk drive 32 determines whether or not there is a time margin for performing error avoidance processing such as retrial, with reference to the maximum read time of the configuration data register (in the step S339). If it is determined that there is a time margin for performing error avoidance processing, the processing flow returns to the step S333 and tries again to read the data of the I-th block from the hard disk. Further, the processing from the step S334 described above is executed.

If it is determined that there is not a time margin for performing the error avoidance processing, error compensation is performed on the data of the I-th block (in the step S335), and the processing flow thereafter goes to the step S335 and transfers the data of the I-th block to the host computer section 20.

The host computer section 20 receives the data of this I-th block and stores it into the buffer (in the step S223).

Thus, according to the present embodiment described above, time management is carried out with respect to IT data so that continuity of the output of AV data is guaranteed and error countermeasure processing method is specified in accordance with read target information for every read command. Therefore, with respect to each of the IT data and AV data, appropriate error countermeasure processing is performed and reading of data can be performed.

Further, according to the above-described embodiment, time management is performed also on IT data, and therefore, a large amount of buffer need not be provided for the host computer section side.

(Other Embodiments)

In the embodiment described above, information for time management is sent as attribute information to the hard disk device 30 from the host computer section 20 separately from read commands and is previously set. However, the information can be sent together with selection instruction information for an error countermeasure processing method, to the hard disk device section 30 from the host computer section 20 for every read command. In this case, time margins are respectively set for AV data and IT data.

Inversely, the selection instruction information for an error countermeasure processing method can, of course, be sent from the host computer section 20 to the hard disk device section 30, separately from the attribute information.

Although the host computer section 20 determines the time margin for time management in correspondence with the capacity of the buffer or the transfer rate of data in the above embodiment, the host computer section 20 may, of course, set the time margin for time management in response to an input concerning the setting of the margin time from a user.

Also, in the explanation made above, the hard disk device section is included in the set-top box. However, the hard disk device may be an external device separate from the set-top box, of course.

In addition, the electronic device to which the present invention can be applied is not limited to a set-top box as long as the electronic device comprises a host computer section and a drive device section using storage medium having a large capacity.

The storage medium is not limited to a hard disk but may be any medium as long as the medium is randomly accessible and has a large capacity, such as a DVD or a semiconductor memory.

Of course, the data for which response time guarantee is important is not limited to AV data, and IT data is not limited to EPG data or Web data as described above. The AV data is not limited to compressed data but may be digital AV data based on a base band.

Also, the present invention is not dependent on the write method of the storage medium but is applicable to all case where information for which response time guarantee is important and information for which reliability is important are mixedly read out from the storage medium in one sequence.

What is claimed is:

1. A method of reading multimedia information in which first information for which response time guarantee is important and second information for which reliability is important are read from a storage medium, with the first information and the second information mixed with each other, wherein management of read time is performed on each of the first and second information;

each of the first information and the second information is read in units of predetermined amounts;

a maximum value of a read time for the unit of the predetermined amount is set to manage the read time;

a plurality of error countermeasure processing methods are pre-defined for a condition in which an error occurs in information read out when reading the first or second information in units of predetermined amounts; and the method further comprising setting, upon reading the first or second information, one of the plurality of error countermeasure processing methods to be used if a read error occurs;

wherein the plurality of error countermeasure processing methods comprises at least an instant interruption type, continuous read processing with an error report, and continuous read processing without an error report.

2. A method according to claim 1, wherein
the maximum value of the read time is set independently for each of the first and second information.

3. An apparatus for reading multimedia information, comprising:
a host computer section; and
a storage medium drive device section for reading first information for which response time guarantee is important and second information for which reliability is important from a storage medium in which the first information and the second information are written, with the first information and the second information mixed with each other, in accordance with a read instruction from the host computer section, and for outputting the first information and the second information thus read, to a side of the host computer section, wherein
the storage medium drive device section performs management of read time on each of the first information and the second information, in accordance with an instruction from the host computer;
the storage medium drive section reads each of the first and second information in units of predetermined amounts, and manages the read time by means of a maximum value of the read time for the unit of the predetermined amount, depending on an instruction from the host computer section;
the host computer section instructs the storage medium drive device of which of a plurality of pre-defined error countermeasure processing methods should be used as error countermeasure processing in the event an error occurs in information read out when reading the first or second information in units of the predetermined amounts;
the storage medium drive device section executes error countermeasure processing when reading the first or second information in units of the predetermined amounts, by means of one of the plurality of error countermeasure processing methods which is instructed by the host computer section; and
the plurality of error countermeasure processing methods comprises at least an instant interruption type, continuous read processing with an error report, and continuous read processing without an error report.

4. An apparatus according to claim 3, wherein
the host computer section sets the maximum value of the read time independently for each of the first information and the second information, and instructs the storage medium drive device section of the maximum value.

5. An apparatus according to claim 3 wherein
the host computer section makes a read command for the unit of the predetermined amount of the first or second information include instruction information as to which of the plurality of error countermeasure processing methods should be used.

6. A method of reading multimedia information, comprising the steps of:
pre-defining a plurality of error countermeasure processing methods including an instant interruption type, continuous read processing with an error report, and continuous read processing without an error report;
reading first and second information from a storage medium, the first and second information being multiplexed with one another, wherein response time guarantee is of higher importance than reliability for the first information and reliability is of higher importance than response time guarantee for the second information; and
managing read time for reading both the first and second information;
setting said instant interruption type of error countermeasure processing method upon reading said first information;
wherein said read time is managed with respect to reading said second information such that continuity of output of said first information is guaranteed and a selected one of said error countermeasure processing methods is set in accordance with read target information for every read command;
each of the first information and the second information is read in units of predetermined amounts; and
a maximum value of a read time for the unit of the predetermined amount is set to manage the read time.

7. The method according to claim 6, wherein upon reading the second information, the one of said error countermeasure processing methods is selected and set in accordance with the type of data to be read.

8. The method according to claim 6, wherein upon reading the second information, the one of said error countermeasure processing methods is selected and set in accordance with the application purpose of the data to be read.

* * * * *